United States Patent

[11] 3,615,180

[72] Inventors Makoto Kadotani
Ube-shi;
Seishiro Isobe, Yamaguchi-shi, both of Japan
[21] Appl. No. 793
[22] Filed Jan. 5, 1970
[45] Patented Oct. 26, 1971
[73] Assignee Central Glass Co. Ltd.
Yamaguchi-ken, Japan

[54] METHOD OF IMPROVING THE QUALITY OF SYNTHETIC CRYOLITE
5 Claims, No Drawings

[52] U.S. Cl. .................................................. 23/88, 204/67
[51] Int. Cl. ...................................................... C01f 7/54
[50] Field of Search ............................................ 23/88

[56] References Cited
UNITED STATES PATENTS

| | | | |
|---|---|---|---|
| 3,049,405 | 8/1962 | Trupiano et al. ............. | 23/88 |
| 3,486,845 | 12/1969 | Vancil et al. ................. | 23/88 |
| 3,493,330 | 2/1970 | Vancil et al. ................. | 23/88 |
| 3,506,395 | 4/1970 | Yamaguchi et al. .......... | 23/88 |

*Primary Examiner*—Edward Stern
*Attorney*—Sherman and Shalloway

ABSTRACT: A method of producing synthetic cryolite having a reduced ignition loss, which comprises repulping synthetic cryolite in an aqueous solution of below pH 4 of an acid selected from the group consisting of hydrochloric acid, nitric acid and sulfuric acid, for at least 10 minutes at a temperature below the boiling point of said aqueous solution, and thereafter recovering the purified synthetic cryolite.

METHOD OF IMPROVING THE QUALITY OF SYNTHETIC CRYOLITE

This invention relates to a method of improving the quality of synthetic cryolite, and more particularly, to a method of obtaining synthetic cryolite with reduced ignition loss by the repulping treatment of synthetic cryolite in a specific acidic aqueous solution.

Synthetic cryolite generally contains bond water or impurities such as compounds resulting from the substitution of hydroxyl groups for a part of the fluorine atoms of the cryolite ($Na_3AlF_6$, i.e., [$Na_3Al$ (F·OH) 6] or [$Na_3Al$(F·OH)$_6$·X$H_2O$], or also contains aluminum hydroxide as impurity depending on its manufacturing process. Thus, synthetic cryolite has the defect that its ignition loss is greater than that of natural cryolite. When such a synthetic cryolite is used in an electrolytic aluminum reduction cell, the hydroxyl group or bond water contained in the synthetic cryolite reacts with the cryolite and fluorine is converted to hydrogen fluoride which volatilizes and escapes to result not only in the loss of fluorine but also an air pollution problem. For preventing the above-mentioned defects which occur when synthetic cryolite is used for the reduction of aluminum, the prior arts in all cases have adopted the method of calcining the synthetic cryolite at a temperature of 350°–700° C. after its drying. However, the calcination of the synthetic cryolite at an elevated temperature such as mentioned above after the drying of the cryolite, is a troublesome thing and a special step is required. Moreover, during this operation, hydrogen fluoride volatilizes.

As far as we know, a method of reducing the ignition loss of synthetic cryolite by means other than calcination has not been known as yet.

We have found that the ignition loss of synthetic cryolite can be greatly reduced without submitting the synthetic cryolite to the above-noted calcination step when synthetic cryolite is submitted to a repulping treatment in an aqueous solution of below pH4 of an acid selected from the group consisting of hydrochloric acid, nitric acid and sulfuric acid, at a temperature below the boiling point of said aqueous solution for at least 10 minutes.

An object of the present invention is to provide a method of reducing the ignition loss of synthetic cryolite by a simple operation without calcination of the synthetic cryolite. Another object is to provide a method of improving the quality of synthetic cryolite which makes it possible to reduce the ignition loss of synthetic cryolite and to remove substantially the impurities contained in synthetic cryolite.

The synthetic cryolite to be used in the present invention for improving its quality may be any of those products which have been obtained from known raw materials by known manufacturing methods. The synthetic cryolite products obtained by known procedures differ in their properties depending upon the raw materials and the manufacturing method, but all contain impurities of various kinds.

An example of a composition of a synthetic cryolite is as follows:

| Component | Weight Percent |
| --- | --- |
| Cryolite ($Na_3AlF_6$) min. | 91 |
| Fluorine (F) | 48–52 |
| Sodium (Na) | 31–34 |
| Aluminum (Al) | 13–15 |
| Alumina ($Al_2O_3$) max. | 6.0 |
| $SiO_2$, max. | 0.9 |
| $CaF_2$ | 0.04–0.06 |
| $Fe_2O_3$ | 0.10 |
| $SO_4$ | 0.1–3 |
| $P_2O_5$ | 0.005–0.3 |
| Moisture | 0.05–0.15 |
| Ignition loss* | 1–5 |

*Loss in weight percent as a result of calcination at 800° C. for 1 hour. (This definition of the term "ignition loss" is applicable hereinafter.)

While the invention method is used effectively for improving the quality of synthetic cryolite obtained by known processes, it is particularly efficacious in improving synthetic cryolite which has an ignition loss exceeding 1 percent by weight. In addition, as mentioned above, impurities such as silica, phosphate, sulfate and others are contained in synthetic cryolite. These also can be effectively removed by the repulping treatment which will be fully described hereinafter.

According to the present invention, the hereinbefore described synthetic cryolites are submitted to a repulping treatment in an aqueous solution of an acid selected from the group consisting of hydrochloric acid, nitric acid and sulfuric acid. The term "repulping", as used in the present specification and in the accompanying claims, means an operation which consists of rendering the synthetic cryolite into a slurry state in an aqueous acid solution with agitation. It is important for reducing the ignition loss of the synthetic cryolite that the acid concentration of the aqueous acid solution, expressed as pH, be maintained at 4 or less. The preferable pH for the aqueous acid solution is in the range of from 1 to 2. It is effective to add a small quantity, i.e. not more than 5 percent by weight, of a sodium salt of either hydrochloric acid, nitric acid or sulfuric acid (i.e. Nacl, $NaNO_3$ or $Na_2SO_4$) to the aqueous acid solution used as the repulping medium in this invention. This addition makes it possible to reduce the ignition loss of the synthetic cryolite further. It is preferable that the sodium salts are added in amounts of 0.5–3 percent by weight.

Generally, the use of the repulping medium in an amount of 1–20 parts by weight, and preferably 5–10 parts by weight, for one part of the synthetic cryolite is most desirable for the attainment of the objectives of the present invention.

The temperature of the repulping treatment according to the invention usually ranges from room temperature to the boiling point of the repulping medium, preferably in the range of from 50° to 95° C. Normal atmospheric pressure is used with good results to effect the repulping treatment of the invention. While the time of the repulping treatment varies widely depending upon the pH of the repulping medium and temperature, the treatment time of at least 10 minutes is generally required for reducing the ignition loss of the synthetic cryolite. However, even though the treatment is carried out for more than 3 hours, more improvement cannot be expected. The preferable treatment time ranges is in the range of from 30 minutes to 2 hours.

The repulping treatment is carried out by agitating the synthetic cryolite slurry under the above-mentioned conditions, using a conventional vessel equipped with a stirrer. In order to ensure a uniform contact between the synthetic cryolite and repulping medium and to effect the repulping efficiently, the slurry concentration should be held to below 50 percent be weight, and preferably within a range of 5 to 30 percent by weight. The synthetic cryolite can be added to the repulping medium in its original state, or it also may be added after grinding it to particles having a size less than 50 microns.

The repulping treatment can be carried out in a single stage or two or more stages, and it may be carried out either continuously or batchwise. For example, the repulping treatment can be carried out in two stages, wherein in the first stage the synthetic cryolite is added to the aqueous acid solution and repulping is carried out, after which the slurry is allowed to stand to separate of the supernatant liquid, and thereafter, repulping of the separated slurry in the second stage is conducted optionally after further addition of an aqueous acid solution thereto. The repulping treatment may be carried out by contacting the synthetic cryolite with the aqueous acid solution either countercurrently or concurrently.

In the present invention, the synthetic cryolite which has undergone the repulping treatment as hereinabove described is separated from the repulping medium by a known method of separating the solids from the liquid such as filtration, centrifuging or decantation. The so separated synthetic cryolite is washed with water, if necessary. It then can be put to its final use after just drying it at a temperature, say, of 100°–110° C. to remove its adhering moisture.

The following examples will be given to illustrate the invention further

EXAMPLE 1

Synthetic cryolite was slurried with tenfold amount of water, based on the solid, and thereafter adjusted with hydrochloric acid to the pH indicated in table I. Repulping at the various temperatures was carried out for 2 hours, after which the treated cryolite was separated, washed (2 liters of water per kilogram of cryolite) and dried at 110° C. The analysis of the treated cryolite and untreated cryolite is shown in table I.

Thus, it can be seen from the results presented in table I that the ignition loss of synthetic cryolite could be reduced not only to the level comparable to that of the natural cryolite, but also impurities contained could be eliminated effectively by the repulping treatment according to the present invention.

EXAMPLE 2

The repulping treatment was carried out as in example I, but using nitric acid instead of hydrochloric acid to adjust the pH to 1–2. The results are shown in table II.

TABLE I

| Sample | Repulping conditions pH | Temp., ° C. | Na | Al | F | $P_2O_5$ | $SO_4$ | $SiO_2$ | $TiO_2$ | $V_2O_5$ | $Fe_2O_3$ | Ig. loss (at 800° C.) | Remarks |
|---|---|---|---|---|---|---|---|---|---|---|---|---|---|
| Theoretical values | | | 32.87 | 12.85 | 54.30 | | | | | | | | |
| Natural product | | | 29.17 | 12.51 | 53.13 | 0.004 | | 0.34 | 0.0013 | | 0.025 | 1.13 | $CaF_2$ 4.29%. As a result of X-ray powder diffraction analysis, $CaF_2$, $Na_5Al_3F_{14}$ was found. |
| Test sample [1] | | | 31.70 | 12.16 | 51.65 | 0.027 | 0.80 | 0.82 | 0.0010 | 0.0008 | 0.06 | 2.90 | As a result of infrared spectrum analysis, bond water was found present. |
| $H_2O$ treatment [2] | | 90 | | | | 0.027 | | 0.81 | | | | 2.88 | No change as compared with the product before repulping treatment. |
| After repulping | 3–4 | 90 | | | | 0.019 | | | | | | 1.70 | As a result of infrared spectrum analysis, bond water was found present. |
| Do | 1–2 | 90 | | | | 0.004 | 0.13 | 0.19 | | | | 0.91 | No change as compared to natural cryolite as a result of infrared spectrum analysis, DTA and TGA. As a result of X-ray diffraction analysis, only $Na_3AlF_6$ was found. |
| Do | 1–2 | 50 | 32.64 | 12.82 | 53.18 | 0.005 | 0.14 | 0.22 | 0.0008 | [3] | 0.005 | 0.87 | Do. |
| Do | 1–2 | 30 | | | | 0.014 | | | | | | 1.51 | As a result of X-ray diffraction analysis, only $Na_3AlF_6$ was found. As a result of infrared spectrum analysis, bond water was found present. |
| Do | 1–2 | 20 | | | | 0.016 | | | | | | 1.69 | As a result of X-ray powder diffraction analysis, only $Na_3AlF_6$ found. As a result of infrared spectrum analysis, bond water was found present. |
| Do | 0 | 50 | | | | 0.003 | 0.13 | 0.05 | 0.0002 | [3] | Trace | 0.95 | As a result of X-ray powder diffraction analysis, a very small amount of $Na_5Al_3F_{14}$ found. Other results were the same as those of the natural cryolite. |

[1] Before repulping.
[2] The procedures used in treating $H_2O$ were similar to the repulping with HCl.
[3] Below 0.0001.

TABLE II

| Sample | Repulping temperature, ° C. | Na | Al | F | $P_2O_5$ | $SO_4$ | $SiO_2$ | $TiO_2$ | $V_2O_5$ | $Fe_2O_3$ | Ig. loss (at 800° C.) | Remarks |
|---|---|---|---|---|---|---|---|---|---|---|---|---|
| Before repulping: | | | | | | | | | | | | |
| Sample A | | 31.70 | 12.16 | 51.65 | 0.027 | 0.80 | 0.82 | 0.0010 | 0.0008 | 0.06 | 2.90 | |
| Sample B | | 31.25 | 12.87 | 51.17 | 0.110 | 0.24 | 0.93 | | | | 3.14 | |
| After repulping: | | | | | | | | | | | | |
| Sample A | 50 | 32.51 | 12.85 | 53.20 | 0.004 | 0.13 | 0.21 | 0.0007 | <0.0001 | 0.006 | 0.98 | As a result of X-ray powder diffraction analysis, only $Na_3AlF_6$ found. Results of DTA, TGA and infrared spectrum analysis were the same as those of the natural cryolite. |
| Sample A | 70 | | | | 0.003 | 0.13 | 0.19 | 0.0007 | <0.0001 | 0.006 | 0.91 | Do. |
| Sample B | 70 | 32.58 | 12.75 | 52.98 | 0.008 | 0.06 | 0.24 | | | | 0.89 | Do. |

EXAMPLE 3

Synthetic cryolite was slurried with a tenfold amount of water, based on the solid. After adjusting the pH of the slurry to 1-2 with either nitric or hydrochloric acid, and a sodium salt of each acid, i.e. a small amount of either $NaNO_3$ or NaCl (3 percent by weight of the cryolite), was added to the respective cryolite slurries. The repulping treatment was then carried out at 50° C. as in example 1. The results are shown in table III.

TABLE III

| Sample | Analytic values of cryolite (dry basis) wt. percent | | | | | | | Remarks |
|---|---|---|---|---|---|---|---|---|
| | Na | $NH_3$ | Al | F | $P_2O_5$ | $SO_4$ | Ig. loss (at 800° C.) | |
| Test Sample: Before repulping | 30.95 | 0.78 | 12.41 | 51.62 | 0.025 | 0.84 | 4.48 | As a result of infrared spectrum analysis, $NH_4^+$ found. As a result of X-ray powder diffraction analysis, a very small quantity of $(NH_4)_2 NaAlF_6$ was found. |
| After repulping: $HNO_3$ treatment | 32.68 | 0 | 12.56 | 53.12 | 0.003 | 0.14 | 0.87 | As a result of X-ray powder diffraction analysis, only $Na_3AlF_6$ found. Results of DTA, TGA and infrared spectrum analysis were the same as those of the natural cryolite. |
| HCl treatment | 32.56 | 0 | 12.71 | 53.15 | 0.003 | 0.13 | 0.89 | Do. |

As illustrated in the foregoing examples, according to the present invention, the ignition loss (at 800° C.) of synthetic cryolite can be reduced to a level comparable or similar to that of the natural cryolite, i.e. to about 1 percent by weight or less, by a simple operation consisting of submitting the synthetic cryolite to a repulping treatment in an aqueous acid solution.

Moreover, in this invention, not only is the ignition loss of synthetic cryolite reduced by submitting it to the hereinbefore described repulping treatment but at the same time such impurities as phosphate, silica sulfate and others contained in the synthetic cryolite can also be eliminated effectively.

For example, as disclosed in Encyclopedia of Chemical Technology, Kirk-Othmer, vol. 9 (second Ed.) at page 542, as little as 0.01 percent $P_2O_5$ in the electrolyte will cause a 1 to 1.5 percent reduction in current efficiency for aluminum production. Thus, disadvantageously the phosphate contained in cryolite causes a drop in the current efficiency in the reduction of aluminum. For removing this defect, U.S. Pat. No. 2,916,352 to Fitch et al. shows that the pH at the time of manufacture of cryolite must be held in an acid state, especially below 2. For instance, when it is intended to produce cryolite from sodium aluminate, sodium fluoride, ammonium fluoride and aluminum fluoride with the pH of less than 2 disclosed in the patent, a large quantity of mineral acids is required. Further, this acid radical becomes a loss, and involves a high cost of production. When ammomium fluoride is used as a source of fluorine, there also arises the necessity of an alkali distillation apparatus for recovering the ammonia, thus making the process more complicated. Further, the content of $P_2O_5$ of the resulting synthetic cryolite disclosed in the patent is 0.3 percent at the lowest, a value considerably higher than that of the natural cryolite (0.003-0.005 percent). On the contrary, according to the present invention, it becomes possible to eliminate the phosphate contained in the synthetic cryolite to a level comparable or superior to that of the natural cryolite by a simple treatment of submitting the synthetic cryolite to the repulping in an aqueous acid solution.

As a method of removing the silica content of the cryolite, there is disclosed a method of repulping synthetic cryolite in a sodium fluoride solution at 90° C. for 1 hour (U.S. Pat. No. 3,061,411), or a method of eliminating the silica content of synthetic cryolite, which comprises calcining at a temperature below about 850° C. in a reduced-pressure oven maintained at below ⅓ atmosphere, the synthetic cryolite as it is in the case where the silica content is present in the form of silicofluoride, or after the repulping treatment with hydrofluoric acid in the case where the silica content is in the form other than silicofluoride, and thereby causing the silica content to volatilize in the form of silicofluoric acid (Japanese Pat. No. 142,208).

Each of the foregoing method is as yet unsatisfactory in that since a fluoride such as sodium fluoride or hydrofluoric acid is used to remove the silica content, the treatment becomes costly and loss of the fluorine component results, and that since fluorides, which are corrosive, are used, the matter of corrosion of the equipment becomes a problem. It is possible to apply the foregoing methods to those synthetic cryolites whose silica acid content is relatively small, they are not easily applicable to the synthetic cryolites whose silica content is relatively great.

In contrast, the present invention makes it possible to readily move the silica content by a simple operation consisting of submitting the synthetic cryolite to a repulping treatment in an aqueous solution of low-cost hydrochloric, nitric or sulfuric acid, without entailing such troubles as corrosion of the equipment and limitation of the class of the synthetic cryolite to be repulped.

Further, U.S. pat. No. 3,194,641 discloses a method wherein the sulfate radical in synthetic cryolite is removed by a procedure consisting of making the synthetic cryolite into a 50 percent slurry with water after its drying or after further calcination at 100°-300° C. and heating the slurry with agitation for one hour at 90°-95° C. or treating it in an autoclave for 1 hour at 220° C. However, such method is not only very complicated from the commercial standpoint but also has the defect that only the sulfate radical can be eliminated from the synthetic cryolite.

In contrast, according to the present invention it is possible to eliminate the phosphate, silica sulfate contained in the synthetic cryolite in a single step and at the same time a reduction in the ignition loss of the synthetic cryolite is achieved. This conjoint effect is achieved by a simple operation consisting of merely submitting the synthetic cryolite to the treatment in an aqueous solution of an acid selected from the group consisting of hydrochloric acid, nitric acid and sulfuric acid, optionally together with a sodium salt thereof.

Other advantages of the present invention are that the operations of filtration and washing of the synthetic cryolite are carried out readily.

We claim:
1. A method of producing synthetic cryolite having a reduced ignition loss, which comprises agitating a slurry of a preformed crude solid synthetic cryolite having the following composition:

| | |
|---|---|
| cryolite | at least 91% |
| fluorine | 48-52% |
| sodium | 31-34% |
| aluminum | 13-15% |
| alumina | up to 6.0% |
| $SiO_4$ | up to 0.9% |
| $CaF_2$ | 0.04-0.06% |
| $Fe_2O_3$ | about 0.10% |
| $SO_4$ | 0.1-3.0% |

| | |
|---|---|
| P$_2$O$_5$ | 0.05–0.3% |
| moisture | 0.05–0.15% |
| ignition loss | 1.0–5.0% | in an aqueous solution of an acid selected from the group consisting of hydrochloric acid, nitric acid and sulfuric acid, said aqueous solution having a pH of less than 4, for a period of time of 10 minutes to 3 hours at a temperature below the boiling point of said aqueous solution and thereafter recovering purified synthetic cryolite.

2. The method of claim 1 wherein the pH of said aqueous solution is in the range from 1 to 2.

3. The method of claim 1 wherein agitation of said slurry is carried out at a temperature of 50° to 95° C.

4. The method of claim 1 wherein said aqueous solution is used in an amount of 1 to 20 parts to 1 part of the synthetic cryolite.

5. A method of producing synthetic cryolite having a reduced ignition loss, which comprises agitating a slurry of a preformed crude solid synthetic cryolite having the following composition:

| | |
|---|---|
| cryolite | at least 91% |
| fluorine | 48–52% |
| sodium | 31–34% |
| aluminum | 13–15% |
| alumina | up to 6.0% |
| SiO$_2$ | up to 0.9% |
| CaF$_2$ | 0.04–0.06% |
| Fe$_2$O$_3$ | about 0.10% |
| SO$_4$ | 0.1–3.0% |
| P$_2$O$_5$ | 0.005–0.3% |
| moisture | 0.05–0.15% |
| ignition loss | 1.0–5.0% | and up to 5 percent by weight of a sodium salt selected from the group consisting of sodium chloride, sodium nitrate and sodium sulfate in an aqueous solution of an acid selected from the group consisting of hydrochloric acid, nitric acid and sulfuric acid, said aqueous solution having a pH of less than 4, for a period of time of 10 minutes to 3 hours at a temperature below the boiling point of said aqueous solution and thereafter recovering purified synthetic cryolite.

* * * * *